E. D. BELKNAP.
SELECTIVE ADDRESSING MACHINE.
APPLICATION FILED AUG. 27, 1912.
1,134,096.
Patented Apr. 6, 1915.
8 SHEETS—SHEET 1.
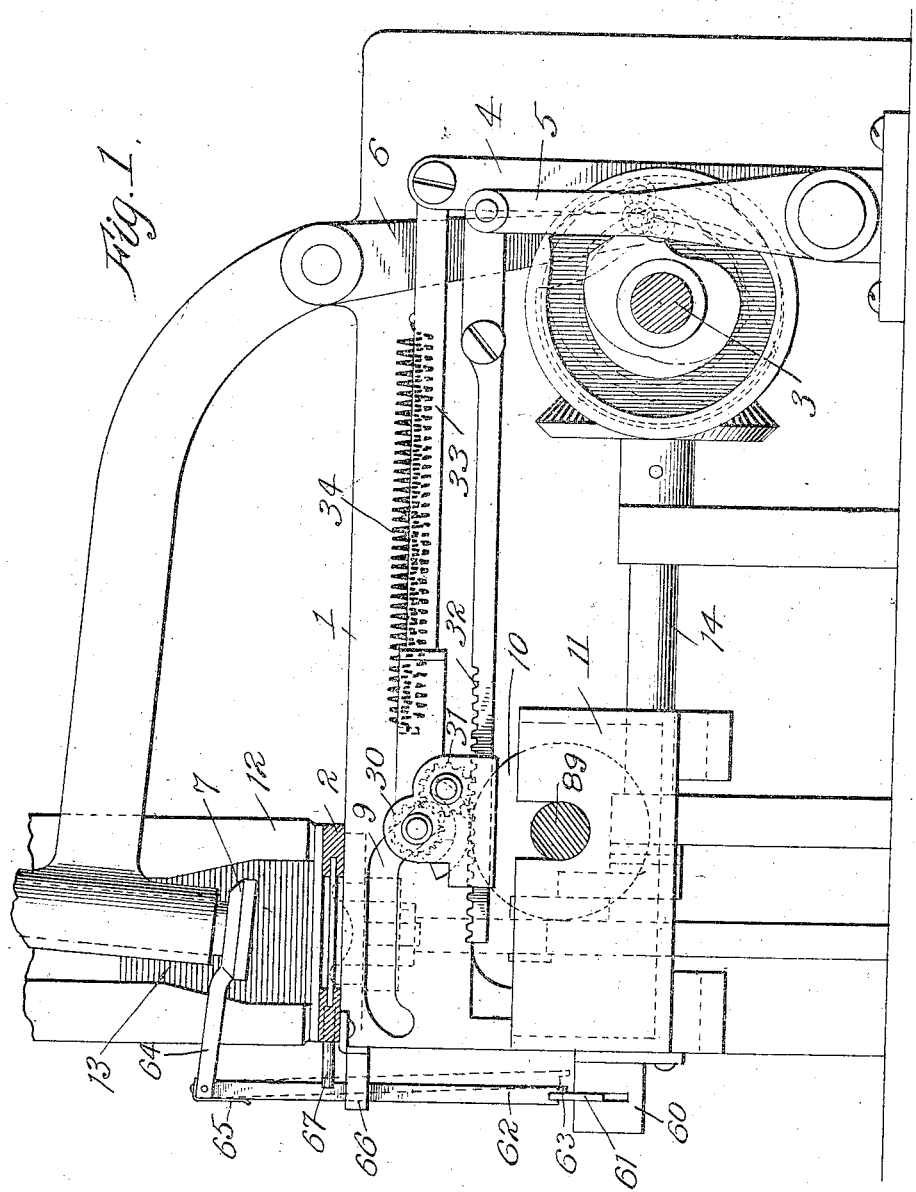

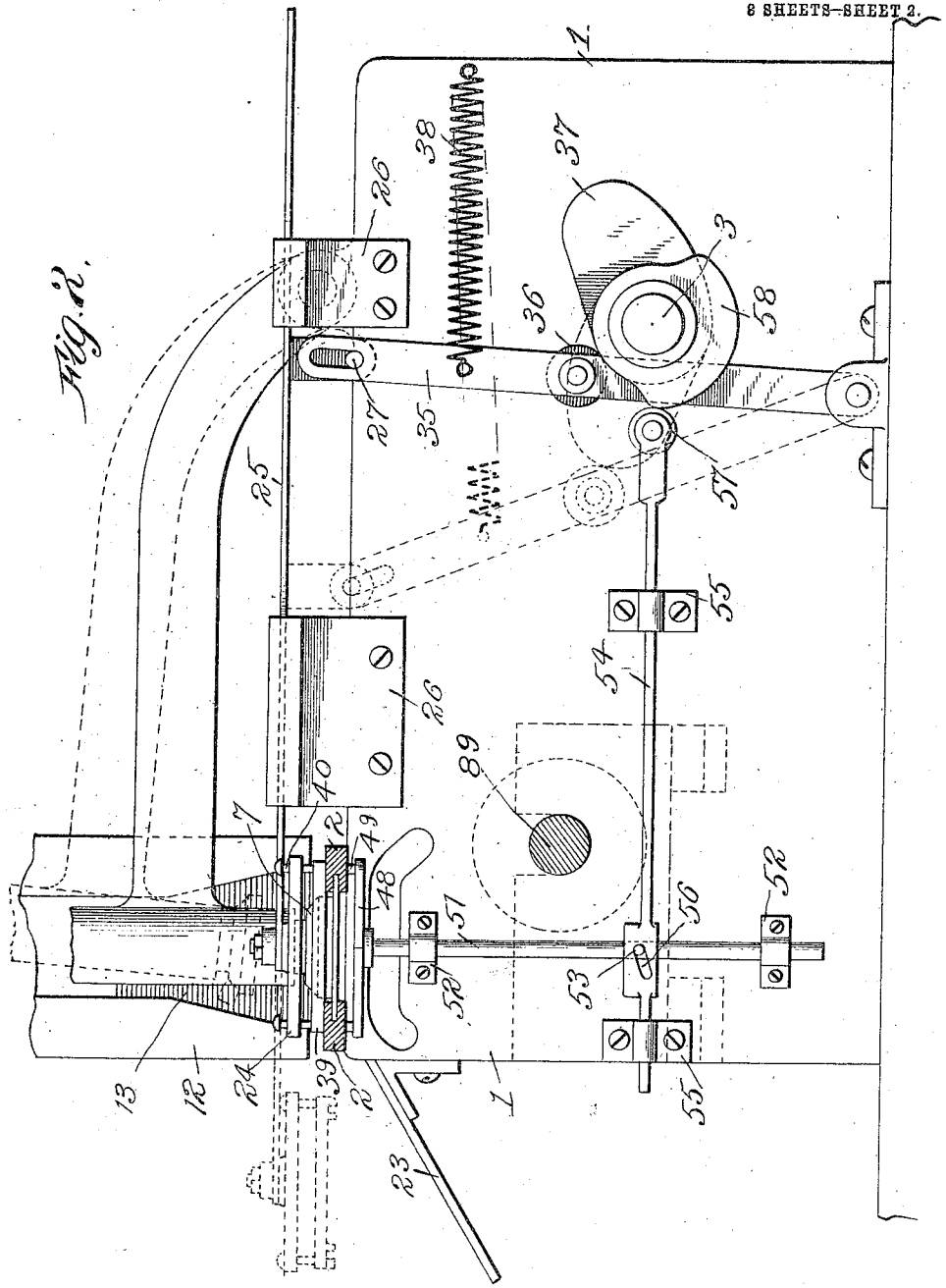

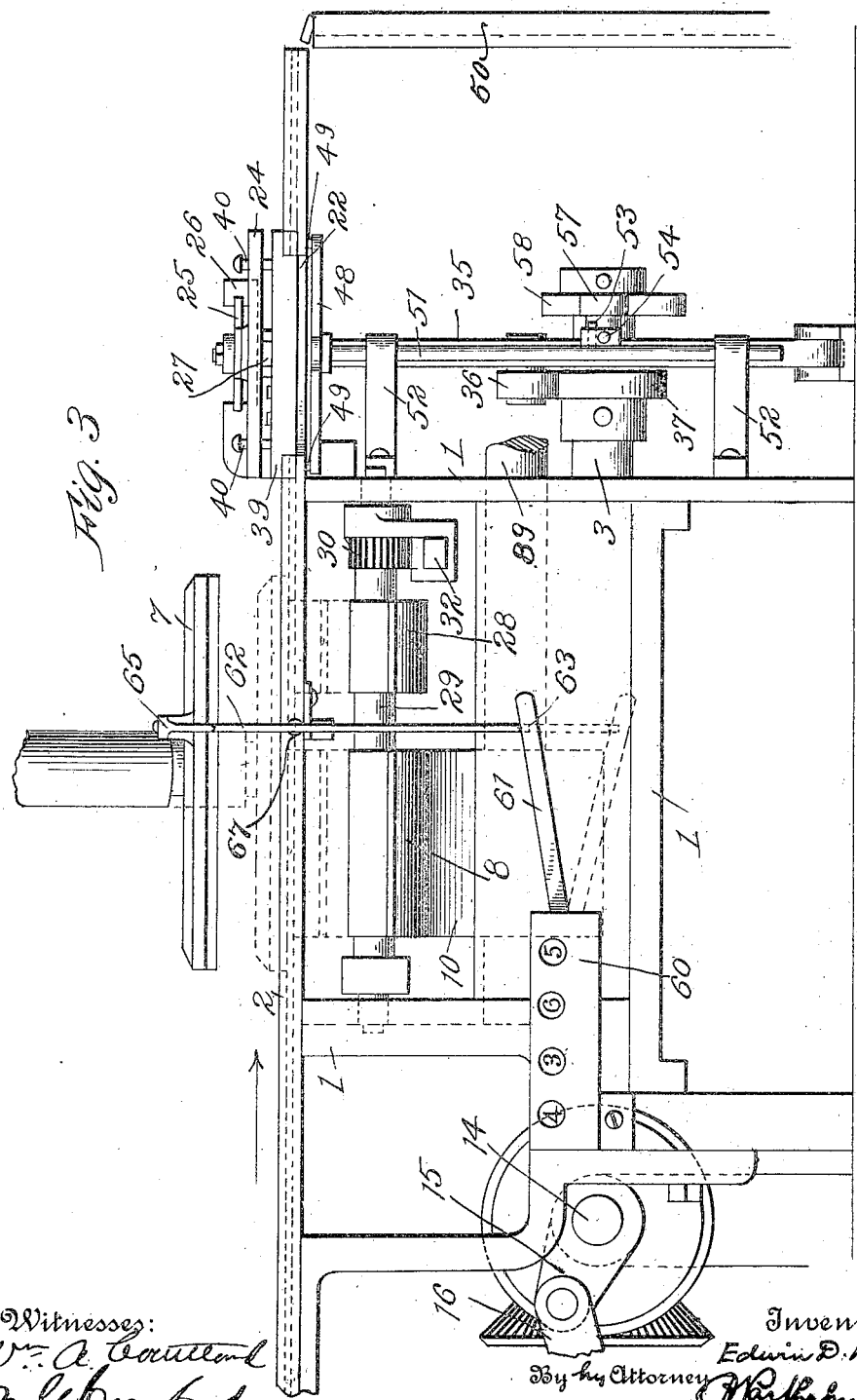

E. D. BELKNAP.
SELECTIVE ADDRESSING MACHINE.
APPLICATION FILED AUG. 27, 1912.
1,134,096.
Patented Apr. 6, 1915.
8 SHEETS—SHEET 4.
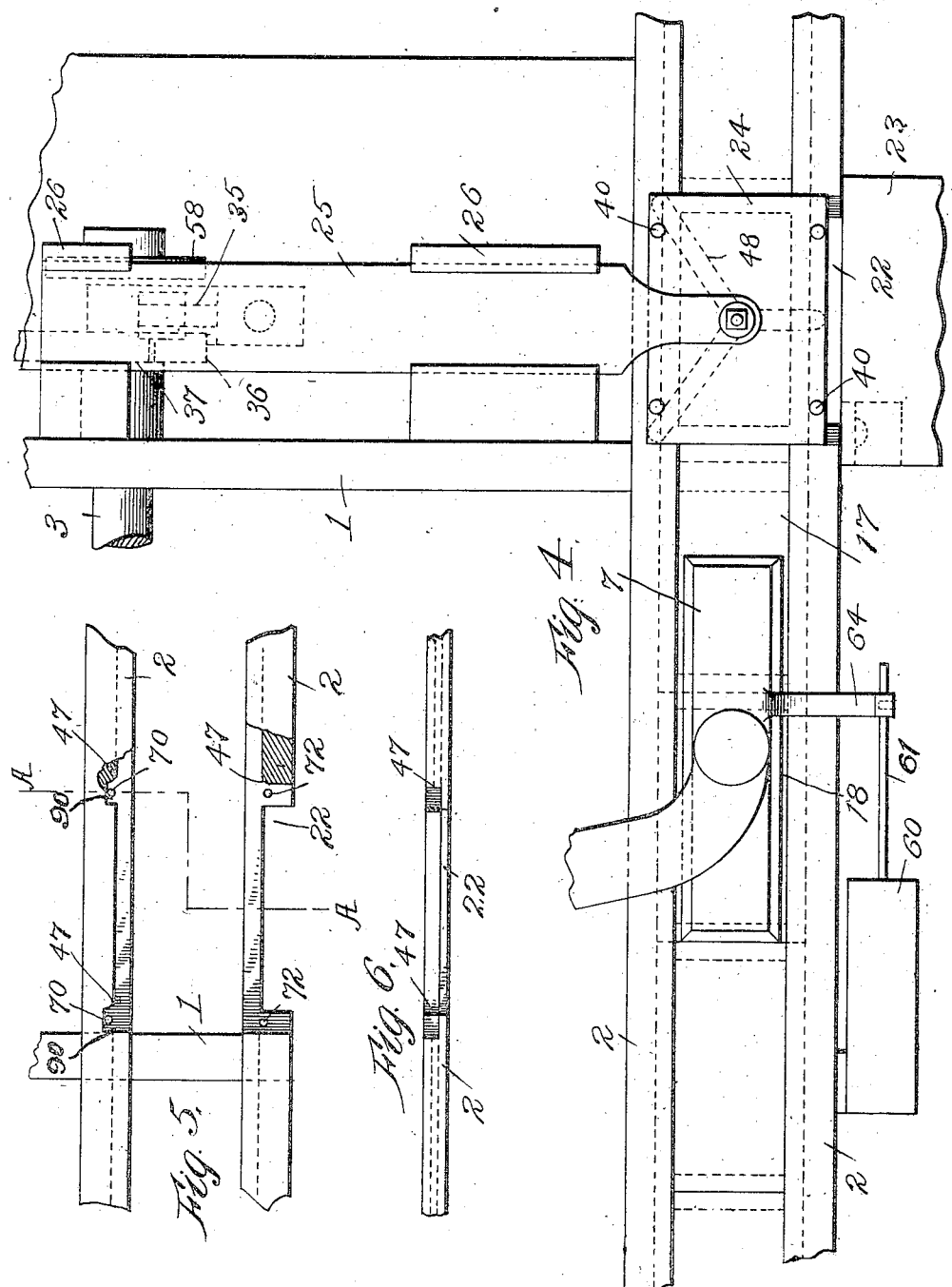
Witnesses
Wm. A. Cruttland
M. J. Crawford
Inventor
Edwin D. Belknap
By his Attorney

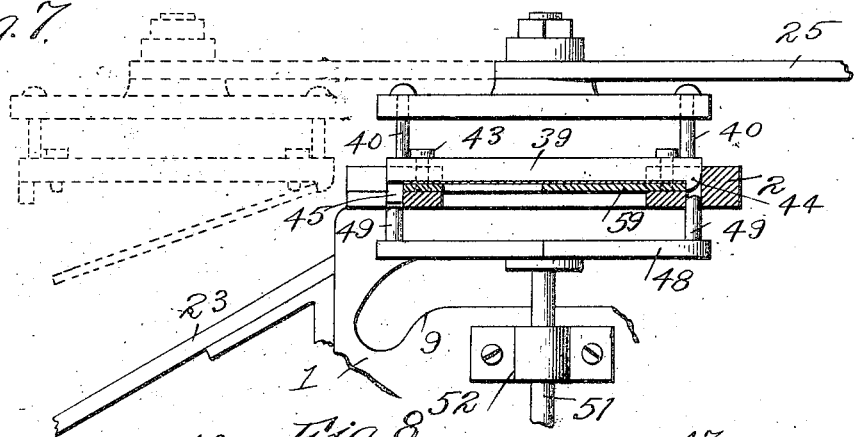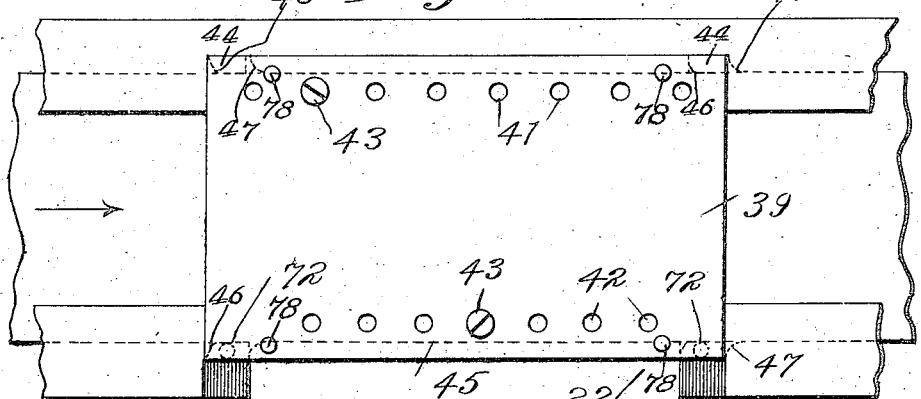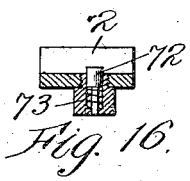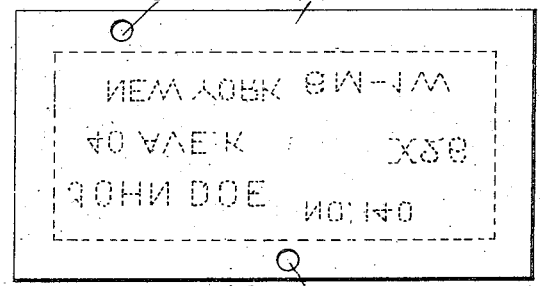

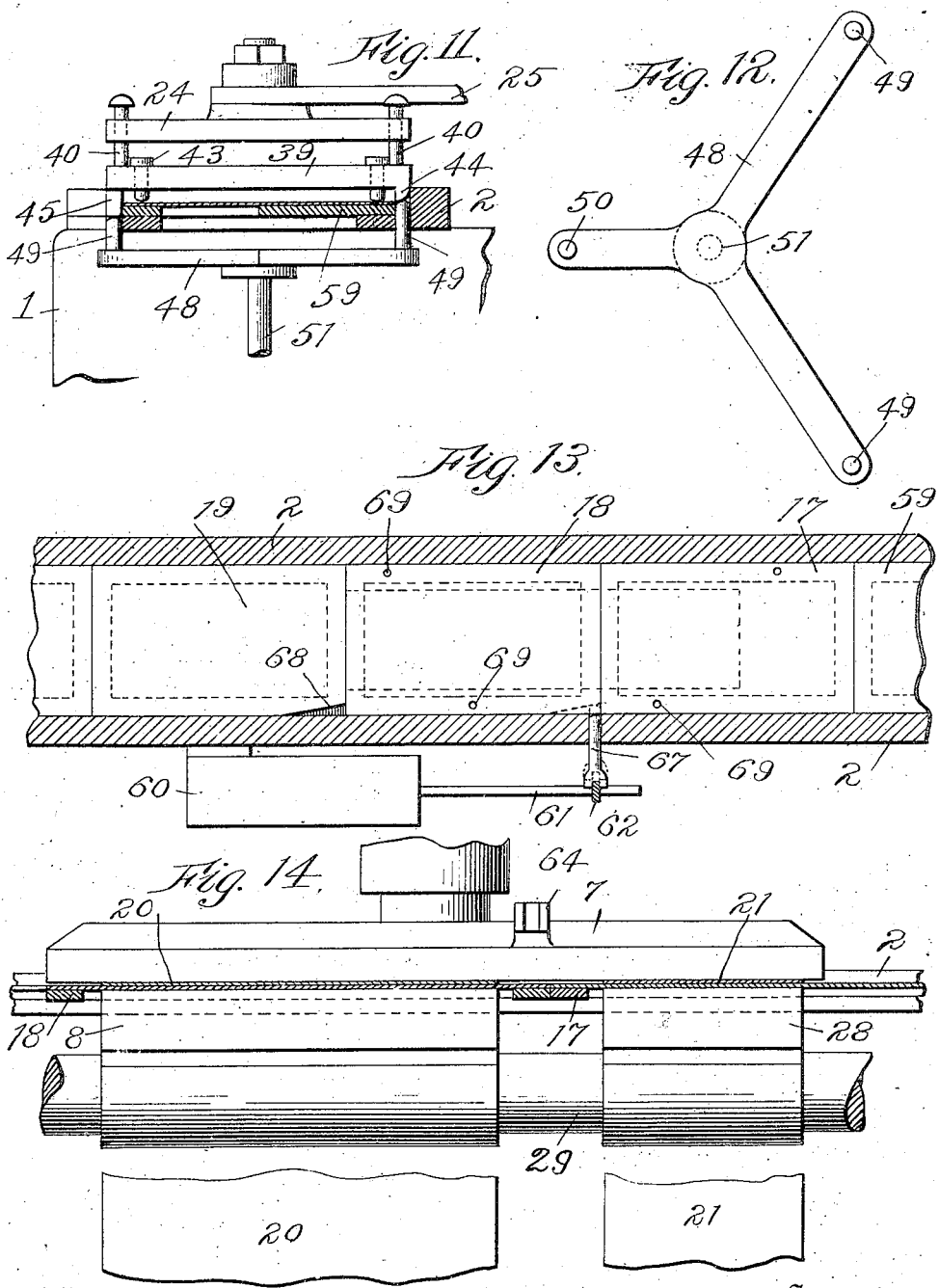
E. D. BELKNAP.
SELECTIVE ADDRESSING MACHINE.
APPLICATION FILED AUG. 27, 1912.
1,134,096.
Patented Apr. 6, 1915.
8 SHEETS—SHEET 6.

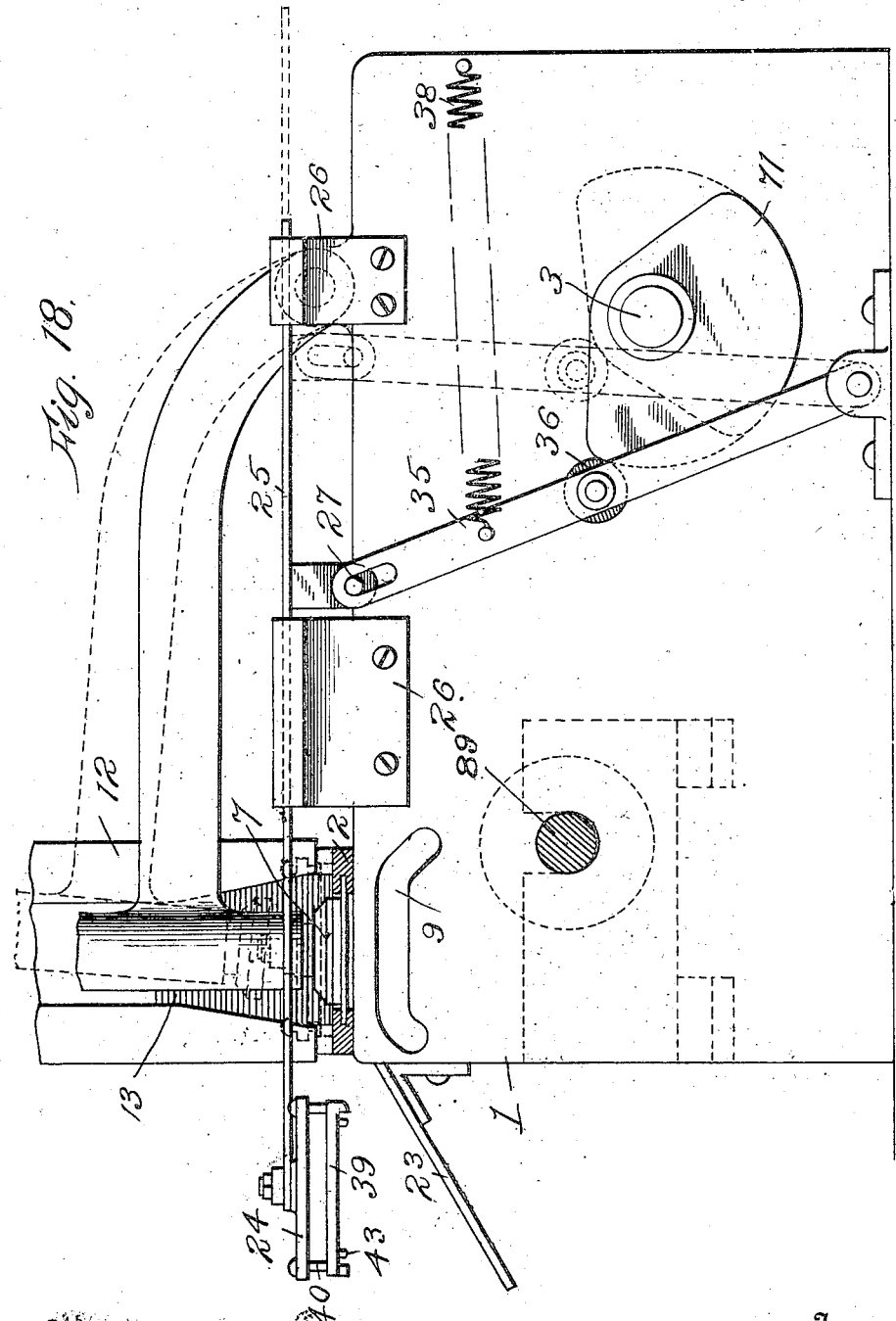

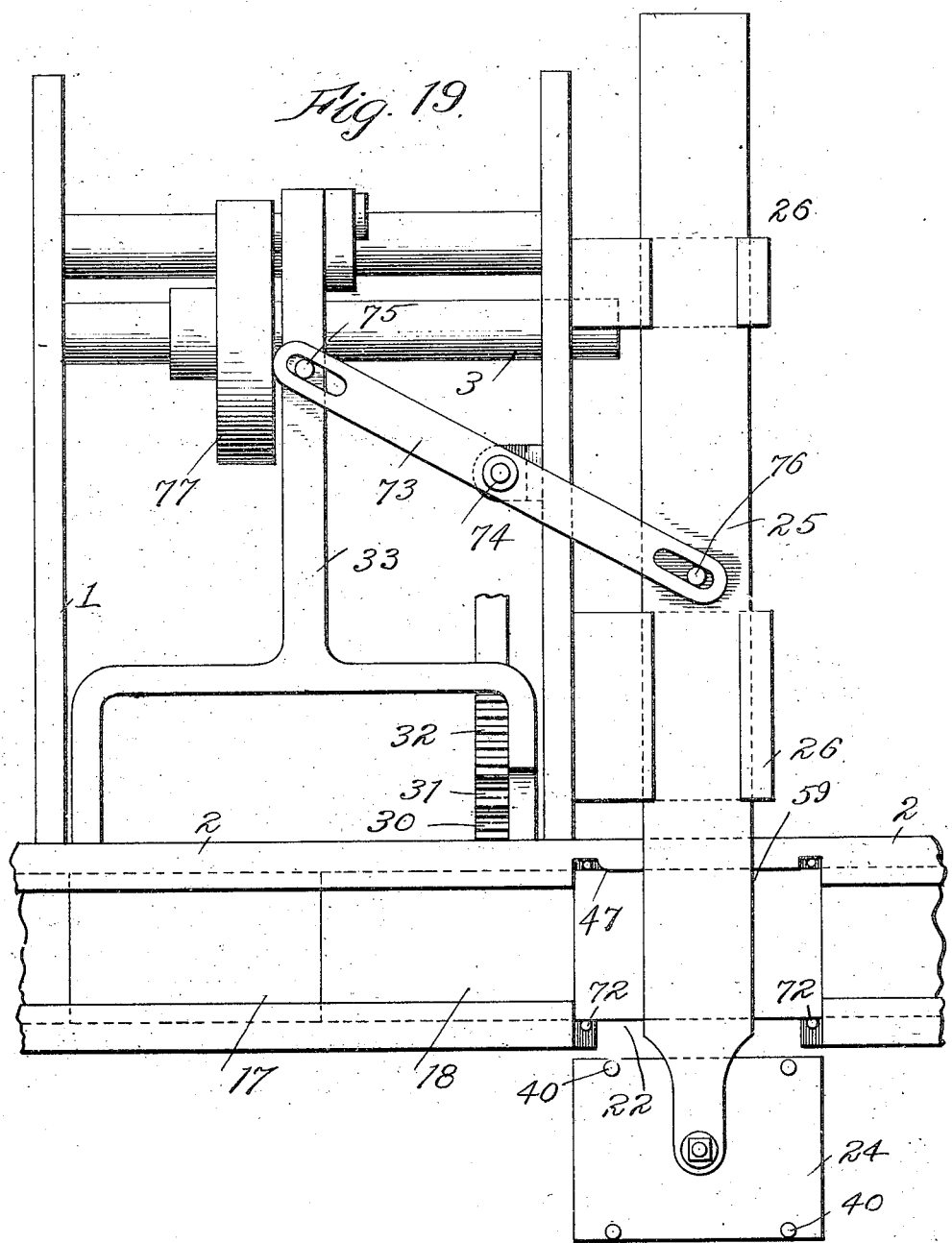

UNITED STATES PATENT OFFICE.

EDWIN D. BELKNAP, OF NEW YORK, N. Y.

SELECTIVE ADDRESSING-MACHINE.

1,134,096.  Specification of Letters Patent.  Patented Apr. 6, 1915.

Application filed August 27, 1912. Serial No. 717,254.

*To all whom it may concern:*

Be it known that I, EDWIN D. BELKNAP, a citizen of the United States of America, residing at New York city, borough of Manhattan, county and State of New York, have invented certain new and useful Improvements in Selective Addressing-Machines, of which the following is a specification.

My invention relates to address printing machines and has its most useful application to that type of machine using stencil cards as a part of the printing apparatus.

It is particularly adapted for use on the type of machine shown and described in my U. S. Patent No. 976,142 granted Nov. 22, 1910. In the form of machine there shown a series of cards on which are stenciled a series of mailing addresses are fed from a storage magazine, along a set of guides to a receiving magazine and through an inking device which coöperates with the cards, to print the addresses on a strip of paper or series of articles fed to the machine at right angles to the guides.

The present invention comprises means for feeding and printing two such strips of paper, each stencil card being operated on twice, once to print all of the matter stenciled thereon on one strip and the second time to print only a portion of such matter on the other strip. To coöperate with this modified machine a set of stencil cards are used which have one set of matter, as the address, printed near one end, and another set of matter, including various record data, printed near the other end. As a result, one printing (usually the first) produces a record strip for filing containing both the address and the related data, such as date of expiration of the subscription of the addressee, index marks, etc. and a second strip containing only the mailing addresses which may be cut up and pasted to the articles to be mailed or the wrappers therefor.

In operating machines of the character described in my patent referred to it is desirable to attach to it some kind of a registering device which will count the number of addresses printed, but the use of an ordinary device of this kind introduces an error in that different sets of stencil cards, classified geographically or otherwise, are usually separated by inserting blank cards, and the ordinary counting device will register the operation of the machine on a blank card as well as on a stenciled card. The present invention avoids this by introducing a counting device which registers only when a stenciled card passes and not when a blank card passes through the printing apparatus.

In printing the addresses on the mailing lists of periodicals it is usually desired to take out the cards bearing addresses of persons whose subcription will expire before the next issue. To run through the thousands of cards stored in the magazines to do this by hand is a laborious task. The present invention also comprises the production of a set of cards bearing distinctive features corresponding to the different weeks or months of the year and an attachment to machines of this character which can be set to coöperate with the cards having the distinctive feature of any week, and will automatically divert each of said cards from its normal path from the printing apparatus to the receiving magazine, and so eliminate from the set the cards corresponding to expired subscriptions.

The best form of apparatus at present known to me embodying my invention is illustrated in the accompanying eight sheets of drawings in which, Figure 1 is a side elevation of a portion of the machine with a part of the frame and selective mechanism removed, showing the inking mechanism at the end of its stroke and the counting mechanism in position to be operated. Fig. 2 is a similar view in elevation of a portion of the machine showing the platen lowered in the position assumed at the beginning of the printing operation, the selective discharging mechanism being shown in full lines in its normal position of rest and in dotted lines in discharging position. Fig. 3 is a front elevation of the machine with the several mechanisms in the position shown in Fig. 1, that is, just prior to the platen descending to printing position, the card storage magazine and feed mechanism being broken away. Fig. 4 is a plan view of the stencil guideway, a portion of the frame, the selector and the mechanism for operating the same. Fig. 5 is a detail plan view of a portion of the stencil guideway with parts broken away showing how it is constructed to permit the selective mechanism to operate therein. Fig. 6 is a front edge view of the same. Fig. 7 is a detail transverse sectional view of the stencil guideway showing in full lines the selective discharging mechanism after it has descended into selective position on the stencil. The dotted lines show it after it has been moved forward to discharging position. In this view the device for lifting the selector plate to allow the successive feeding of the stencils is shown in its lowermost position. The guideway is sectioned on the line A—A of Fig. 5. Fig. 8 is a detail plan view of the stencil guideway with the selector plate in position thereon and showing the several holes in which the selector pins are placed to make the different combinations for 52 weeks. In this view the selecting pins are set for the 26th week,—the first week in July. In this view the ejector, carrying the selector plate, is removed. Fig. 9 is a front edge view of the same. Fig. 10 is a plan view of one of the stencil cards in the position it assumes during printing and showing holes therein with which selector pins in the selector plate will register when said stencil card is in proper position for selection. Fig. 11 is a view similar to Fig. 7 but shows the device for lifting the selector plate and the selector plate in the position assumed after the said selector plate has been lifted. Fig. 12 is a detail plan view of the spider carrying the pins which engage the selector plate to lift it and permit the feeding of the stencils. Fig. 13 is a sectional plan view of a portion of the guideway showing the stencil cards in printing position with a separating blank card inserted. This view shows the blank card having a portion of one end cut away to permit the trip finger of the counter disabling mechanism to enter therein in order to prevent the counter from registering when the blank is in printing position. The blank is shown in full lines before it comes into operative position. The dotted lines show how the trip fingers coöperate with the blank when the latter is in operative position, to permit the plunger bar on the platen to be deflected from its proper alinement to avoid striking the lever of the counting device, as shown in Fig. 1. Fig. 14 is a longitudinal elevation of the stencil guideway showing the stencils in section with the record and mailing strips of paper passing between the stencil cards and the platen, with the printing rollers in position to print, the plunger of the counting device being removed. Fig. 15 is a detail plan view of the record and mailing strips. Fig. 16 is a detail transverse sectional view of a portion of the stencil card guideway showing one of the stencil retaining pins. Fig. 17 is a detail longitudinal sectional view of same, showing how the selector plate holds the retaining pin down just before the stencil card is ejected over said pin. Fig. 18 is a view similar to Fig. 2 showing a modified form of the invention in which the selective ejector mechanism is arranged to operate in a manner opposite to the mechanism shown in Fig. 2, that is to say, the selective ejector mechanism has its period of rest in extended position, and Fig. 19 is a plan view showing a modified form of gearing for driving the selective ejector directly from the inking mechanism, parts being broken away.

Throughout the drawings, like reference characters indicate like parts.

1 is the main frame across the front of which runs the card guideway 2 along which a line of cards are fed by a reciprocating feed mechanism, not shown, operated by link 16, from crank 15, on shaft 14, driven by bevel gearing from the main shaft 3. The main shaft carries a series of cams which coöperate with cam levers 4 and 5 to operate the printing mechanism and with the lever 6 which carries the vertically reciprocating platen 7. The printing rollers 8 and 28 mounted on shaft 29 are run back and forth along the guide slot 9 under such of the stencil cards 17, 18, 59, as have been fed into printing position under the platen and the roller 8 is replenished with ink in the usual way by doctor roll 10 on shaft 89 partly immersed in ink fountain 11. The ink roller shaft 29 is rotated partially during each motion of translation (produced along guide slot 9 by link 33 and spring 34 coöperating with cam lever 4) by pinion 30 meshing with idler pinion 31, which in turn meshes with rack 32 connected to lever 5. A storage magazine 12 at one end of guideway 2 contains a stack 13 of stencil cards ready to be fed to the printing mechanism, and a receiving magazine 50 is placed at the other end of the guideways to receive the cards after they have passed through the printing mechanism. The cards are arranged in classes, by towns and States, usually, and each set or class is separated from the next by a blank card 19. Two strips of paper, 20 and 21, usually of different widths as shown in Fig. 15 and Fig. 14, are fed crosswise of the card guides over the line of stencil cards and under platen 7, by any convenient means, not shown. The wider strip 20 is of the same width as the length of printing roller 8, and the narrower one 21 corresponds to the shorter printing roller 28, as shown in Fig. 14. The width of strip 20 is nearly equal to the length of the stencil cards.

The foregoing mechanism is that described in my previously mentioned patent, with the addition of the second printing roller 28, and the extension of the platen 7 to cover one card and a portion of another so as to coöperate with both printing rollers. The stencil cards, such as shown at 17 in Fig. 10, have the mailing address of a subscriber stenciled near one end, the left, and certain additional data stenciled near the other end. At each operation of the machine so far described the platen 7 comes down on and completely covers one card, as 18 (see Figs. 4 and 14) and covers also the address bearing portion of the card ahead, 17. The roller 8 which is both an inking and an impression or printing roller prints all the stenciled matter of card 18 on strip 20, thereby forming a record strip, and the shorter roller 28, covering only the address portion of the stenciled matter on card 17, coöperating with the ink left on the card after its previous contact with roller 8, prints the address carried by said card 17 on strip 21. These mailing addresses can be cut off by hand or suitable mechanism and stuck on the periodicals, or wrappers therefor. At the next operation of the machine card 18 is fed a distance equal to its length which places it under strip 21, and its address portion is printed thereon. In other words each stencil card is used twice, once to print all its matter on the record strip, and again to print the address portion on the mailing strip.

After the card has passed through the second printing operation, it is fed, by the next intermittent action of the feed mechanism (not shown), into the selective ejecting apparatus. This consists of a selector plate 39 constituting a transversely movable upper section of card guideway 2, having a downwardly extending front lip 45, fitting into the cutaway portion 22, of the front guide. In front of and under this may be arranged any convenient inclined table or guide 23 for discharging the ejected card away from the machine into any convenient receptacle placed below. The selector plate 39 is yieldingly mounted on a reciprocating ejector plate 24, as by the loose headed pins 40, 40, fast in holes 78, 78, in plate 39 and movable in holes in plate 24.

The ejector plate 24 is mounted on a transversely sliding piece 25 which moves in guides 26, 26, and may be given the desired reciprocating motion, as indicated in dotted line, Figs. 2 and 7, during the period of rest of the card, while the printing operation is going on, by any one of several driving mechanisms. In Fig. 2 a driving mechanism is shown composed of cam lever 35 connected to slide 25 by pin-and-slot connection 27, and carrying cam roller 36 coöperating with cam 37, on main shaft 3, being held against the cam by spring 38.

The selector plate 39 has a line of evenly spaced holes 41 formed in it near the back edge and a line of similar holes 42 near the front edge (see Fig. 8). The holes come over the sides of the frame of the stencil card beneath the plate when the selector plate is in its innermost position, as shown in full lines in Figs. 2 and 7. As shown, there are eight of the holes 41, and seven of those 42. Taking these in combinations of two it is evident that fifty-six different combinations can be produced, which is sufficient to take care of the fifty two weeks of each year. Two pins 43 are adapted to be screwed into any two of these holes as shown in Fig. 8, thus constituting laterally adjustable projections on plate 39. The selector plate 39 also has two short rear lips 44, one at each end of the plate (see Fig. 8), adapted to drop down behind the card when the pins 43, 43, enter two holes 69, 69, in the sides of the frame of a stencil card (see Fig. 10). These short, rear lips 44, 44, fit into the spaces 90, 90, cut out of the rear card guide 2, as shown in Fig. 5. The left hand corners of lips 44, and 45, are curved off at 46, 46, and the corners of the continuing fixed guides 2, are similarly curved off at 47, 47. It is evident, therefore, that the selector plate forms a movable section of the guides 2 along and through which the cards can be fed without interruption if the pins 43, 43, do not project downwardly into the path of the card. To avoid this interference by pins 43, 43, the lifting spider 48, is provided with three upwardly projecting pins 49, adapted to engage the front and rear lips 45 and 44, of the selector plate 39. The two rear pins 49, pass up through holes 70, 70, in the rear card guide 2, said holes being shown in plan in Fig. 5. This spider is carried on plunger 51 mounted in guides 52, 52, and having a pin 53 engaging cam slot 56 on reciprocating rod 54 which slides in guides 55, 55, and carries cam roller 57, at one end coöperating with cam 58, on main shaft 3. This mechanism is timed to lift the selector plate 39, as shown in Fig. 11, just before the card 59 is moved forward under it, and then let it drop on said card when the latter is in position under it. If said card has holes 69, placed properly to receive pins 43 of the selector plate it falls into position with the rear lips 44 behind the card, as shown in Fig. 7. Then, on operation of cam 37, which follows, the card is diverted from its normal track by transverse reciprocation of ejector plate 24, into dotted line position and carried out over chute or guide 23, and drops thereon by gravity. The selector plate 39 is then returned by backward movement of the ejector plate 24 to position in line with guides 2, and lifted by spider 48, before the next card 17 comes along. If said card 17 has a similar set of holes, 69, it is similarly ejected by the next operation. If it has not, the selector pins 43 rest on the surface of the card frame, the lip 44 does not drop down behind the card, and the ejector reciprocates out and back idly without disturbing the card, which, is driven by the next operation of the feed, is driven on in its normal path to the receiving magazine 50.

In order to let the selector plate ride up over the non-ejected card on its return motion the back face of lips 44 are rounded off, as well shown in Fig. 11.

To prevent a card being forced out part way by friction of pins 43, and lip 44, when there is no positive engagement by the selector plate, as first above described, I employ two retainer pins 72, 72, set in pockets in the outer guide 2, as shown in Figs. 8, 9, 16 and 17. These pins are normally held up by light spiral springs 73, and prevent the card from being moved by the ejector, unless the lip 45 of selector plate 39 drops down on them, as shown in Fig. 17. In such case the pins are held down by lip 45, till the edge of the card frame begins to pass over them during its ejection, and they remain down until the card is out of the guides. When the card has passed, they rise to act as a means for retaining the next card in guides 2 during its movement into the ejector space, and during the movement of the ejector, if the selector plate does not fit into the holes 69.

In the modification shown in Fig. 18, the action of the ejector driving mechanism is reversed by substituting the cam 71 for the cam 37, shown in Fig. 2, and advancing the same about 180 degrees ahead of the position of cam 37. In this modification the position of rest of the ejector occurs in the extended position shown in Fig. 18, where it remains during the card feeding action of the machine proper, while in the construction previously described the period of rest of the ejector occurs while it is in line with the card guides 2. In the present modification, as in all others, the reciprocating action of the ejector takes place during the period of rest of the cards, while the printing operation is going on. The selector plate as it comes in rides up over the card opposite the cutaway portion 22, of the guide 2, and, if said card has its holes 69, in position to register with the selector pins 43, they drop into said holes 69, and, on the outstroke of the ejector the card is carried along and discharged as before. If the pins do not drop into the holes, the selector plate merely drags over the card, in, and out again, without disturbing it, pins 72, 72, holding it in place, as before described. In this modification the lifting spider 48, and its driving mechanism, are dispensed with.

In a third form, shown in Fig. 19, the ejector slide 25 is driven from the reciprocating link 33 of the printing mechanism, thus dispensing with cam 37 or 71. If it is desired to have the ejector rest in the extended position, as last described, so as to dispense also with the lifting spider 48, slide 25 in driven by a lever 73, pivoted to frame 1, at 74, and having a pin-and-slot connection 75 with link 33, and a similar connection 76 with slide 25. The cam for driving link 33 through the agency of cam lever 4, is indicated at 77. The operation of the selective ejector mechanism is as before described with reference to Fig. 18, its motion being the same.

The registering mechanism is shown in Figs. 1, 3 and 13. The odometer 60 is operated by lever 61, which is vibrated by plunger 62, having a toe 63, on its lower end to insure normal engagement with lever 61. This plunger is pivoted to arm 64, carried by platen 7, guided in fork 66, and normally forced inward by knuckle spring 65 toward position shown in dotted lines in Fig. 1, which would cause it to miss lever 61 on the downward stroke of the platen. Such inward movement is normally prevented, however, by trip finger 67, which is mounted in guide 2, and has its outer end forked so that plunger 62 slides in it, while its inner end rests against the edges of the line of cards passing along the guides. The blanks 19 each have the corner of that edge on which the finger 67 bears cut away or notched, as shown at 68, in Fig. 13. Consequently, when a blank comes into printing position, finger 67, enters said notch, as shown in dotted lines, plunger 62 then swings into the dotted line position shown in Fig. 1, and misses lever 61 when the platen 7 descends and that operation of the mechanism is not counted. When a stencil card is in position under the platen the plunger is held out in full line position and the counter is actuated every time an address is printed. Consequently every printing operation is counted but whenever a blank comes into first position under the platen the counting mechanism is disabled.

The operation of the machine as a whole is clear from the foregoing detail descriptions. Assuming the machine to be addressing copies of a weekly periodical dated the first week in July, the 26th week in the year, one of the selector pins 43 would be placed in the fourth of the series of holes 42 in the selector plate and the other in the second of the holes 41, as shown in Fig. 8. The selector plate would then drop down and engage every card having holes 69 correspondingly arranged, as shown in Figs. 10 and 7, and the said cards would be ejected after printing, instead of passing on to collecting magazine 50. All other cards bearing addresses, the subscription of which expired in other weeks, having perforations in the frame which would not register with pins 43, 43, would pass on to the collecting magazine for use over again. In stenciling the cards, addresses of subscribers whose subscriptions expired in the second week of July would all be written on cards perforated as shown in Fig. 10. Thus the cards bearing the addresses of subscribers whose subscriptions expired that week would all be eliminated, while other cards would not be diverted from their normal course to the collecting magazine. In the next week one of the pins 43 in the series of holes 41 would be shifted to the third hole in that series, and cards punched to correspond with the holes so occupied would then be eliminated, while cards punched as shown in Fig. 10 would not be disturbed.

It is to be understood of course that in stenciling the cards fifty-two sets of blanks are used one for each week in the year. The blanks for the first week in the year will be punched to form holes 69, corresponding with the first hole in row 42 of the selector plate 39, and the first hole in row 41. The blanks for the second week will be punched corresponding to the first hole in row 42 and the second hole in row 41. The blank for the ninth week in the year will be punched corresponding to the second hole in row 42 and the first in row 41, and so on. In stenciling the cards the operator will note the week in which the subscription to be represented thereby expires, and select a corresponding blank for forming the stencil card.

Various changes in details of mechanism to carry out the functions above described could be made without changing the principle of operation of the apparatus, and such mechanical equivalents would still be within the scope of my invention.

Having, therefore, described my invention, I claim:—

1. The combination with an addressing machine having a storage magazine for stencil cards at one side, a receiving magazine for such cards at the other side, guides extending from one magazine to the other, a printing mechanism located along said guides, and means for feeding the cards from one magazine through the printing mechanism to the other, of a selective ejecting mechanism located at the discharge side of the printing mechanism, and adapted to divert certain of the cards from the guides after they have passed beyond said printing mechanism.

2. The combination with an addressing machine having a storage magazine for stencil cards at one side, a receiving magazine for stencil cards at the other side, guides extending from one magazine to the other, a printing mechanism located along said guides, and means for feeding the cards from one magazine through the printing mechanism to the other, of a selective ejecting mechanism located at the discharge side of the printing mechanism, and adapted to divert certain of the cards from the guides after they have passed through said printing mechanism, said selective ejecting mechanism comprising a transversely movable section of the guides and means for causing said movable section to engage certain of the cards and slip over others.

3. In combination with a guideway and mechanism for feeding a series of cards along said guideway, of a transversely movable section in said guideway, means for moving said section periodically out of the line of said guideway and back again, and selective means on said section adapted to coöperate with certain of the cards when in contact therewith to move them with it on its outward stroke, whereby such cards are removed from the guideway at that point.

4. In combination with a guideway and mechanism for feeding a series of cards along said guideway, with intermediate periods of motion and rest, of a transversely movable section in said guideway, means for moving said section periodically out of the line of said guideway and back again during each period of rest of the card feed mechanism, and selective means on said section adapted to coöperate with certain of the cards when in contact therewith to move them with it on its outward stroke, whereby such cards are removed from the guideway at that point.

5. In combination with a guideway and mechanism for feeding a series of cards along said guideway, of a transversely movable section in said guideway, means for moving said section periodically out of the line of said guideway and back again, and selective means on said section adapted to coöperate with certain of the cards when in contact therewith to move them with it on its outward stroke, said selective means comprising a vertically yielding plate forming the upper portion of the guideway and provided with laterally adjustable projections on its under face.

6. In combination with a guideway and mechanism for feeding a series of cards along said guideway, of a transversely movable section in said guideway, means for moving said section periodically out of the line of said guideway and back again, and selective means on said section adapted to coöperate with certain of the cards when contact therewith to move them with it on its outward stroke, said selective means comprising a vertically yielding plate forming the upper portion of the guideway and provided with laterally adjustable projections on its under face together with means for lifting said plate out of the path of an approaching card in the guideway, and lowering it on the card after the same is in position beneath it and before the beginning of the motion of the plate out of the line of the guideway.

7. As an element in a selective ejecting mechanism for address printing mechanism adapted to operate with stencil cards, a vertically and horizontally movable selector plate provided with laterally adjustable projections on its under face adapted to fit into holes in the cards to be ejected.

8. As an element in a selective ejecting mechanism for address printing mechanism adapted to operate with stencil cards, a vertically movable selector plate provided with laterally adjustable projections on its under face adapted to fit into holes in the cards to be ejected and a lip adapted to drop behind a card when the said projections drop into the holes in the card.

9. In combination with a guideway and mechanism for feeding a series of cards along said guideway, of a transversely movable section in said guideway, means for moving said section periodically out of the line of said guideway and back again, and selective means on said section adapted to coöperate with certain of the cards when in contact therewith to move them with it on its outward stroke, said selective means comprising a vertically yielding plate forming the upper portion of the guideway and provided with laterally adjustable projections on its under face, together with a vertically reciprocating device below said guideway having upwardly extending projections spaced widely enough apart to permit the cards to pass between them, but adapted to engage the under side of the vertically yielding plate when raised.

10. In an addressing apparatus the combination with a series of stencil cards each provided with one or more differently located recesses, printing mechanism and means for feeding the cards therethrough, of an ejector device located in the line of feed of the cards comprising a reciprocating member adapted to engage the recesses on certain of the cards, and means for reciprocating the same transversely of the line of feed of the cards.

11. In an addressing apparatus for periodicals, the combination with a series of stencil cards each provided with one or more recesses arbitrarily located according to the date of expiration of the subscription represented by the address stenciled on the card, printing mechanism and means for feeding the cards therethrough, of a selective ejector device located in the line of feed of the cards beyond the printing mechanism comprising a member provided with laterally adjustable projections adapted to engage the recesses on that set of cards with which they are correspondingly adjusted, and means for reciprocating said member transversely of the direction along which the cards are driven by the feeding apparatus, whereby the cards bearing addresses of persons whose subscriptions are expiring are automatically diverted from the normal line of feed in the machine after they have passed through the printing mechanism.

12. In an addressing apparatus the combination with a series of stencil cards interspersed with blanks, a printing device and mechanism for feeding said cards and blanks therethrough, of a counting device and means operating said counting device each time a stencil card passes through the printing mechanism but disabling it each time a blank passes through.

13. In an addressing apparatus the combination with a series of stencil cards interspersed with blanks, a printing device and mechanism for feeding said cards and blanks therethrough, of a counting device and means operating said counting device each time a stencil card passes through the printing mechanism but disabling it each time a blank passes through, said means comprising a recessed edge for each blank, and a trip finger projecting from the driving mechanism of the counting device adapted to enter the recess.

14. The combination with a set of guides, a series of cards adapted to move along said guides, some of which cards have recesses in one edge, and mechanism for feeding said cards along said guideway, of means for registering the passage of each card, and trip mechanism for disabling said registering means actuated by the passage of each card having a recess cut in its edge.

15. The combination with a set of guides, a series of cards adapted to move along said guides, some of which cards have notches in one edge, and mechanism for feeding said cards along said guideway, of a counting device, an operating lever connected thereto, a reciprocating pivoted plunger normally in line with and adapted to strike said lever when reciprocated, a spring normally tending to swing said plunger to one side of its normal position, so that it will not strike the lever when reciprocated, a trip finger extending from that side of the plunger into the card guides bearing against an edge of the cards and normally holding said plunger in line with the lever except when said finger engages a notch in a card edge, and means for reciprocating the plunger at the passage of each card, whereby the counting device is actuated each time a printing operation is performed with a card having no notch, but is not actuated when a notched card comes opposite the trip finger.

16. An addressing apparatus comprising an inking device, a reciprocating platen, guides adapted to pass a series of stencil cards and blanks past the inking device and platen, and mechanism for feeding said cards along said guides, combined with a counting device, connections from the platen adapted to actuate the counting device at each reciprocation of the platen, and means for disabling said connection during the passage of a blank.

17. An addressing apparatus comprising an inking device, a reciprocating platen, guides adapted to pass a series of stencil cards and blanks past the inking device and platen, and mechanism for feeding said cards along said guides, combined with a counting device, connections from the platen adapted to actuate the counting device at each reciprocation of the platen, and means for disabling said connection during the passage of a blank, comprising recessed edges for the blanks, and a trip finger located in the guides and adapted to engage the edges so recessed.

18. An addressing apparatus adapted to operate with a series of stencil cards of uniform length, having guides, mechanism for intermittently feeding a succession of such cards endwise therethrough a distance at each operation of the apparatus equal to the length of a card and a platen extending over said guides a distance sufficient to cover one card entirely and a portion of another, combined with two simultaneously operating printing rollers and mechanism for rolling the same under the cards and platen across the line of feed of the cards during each period of rest between the operations of the feeding device, the first of said rollers being long enough to cover the entire area of stenciled matter on a card when it rests in the line of travel of said roller, while the second roller is only long enough to cover a portion of the stenciled matter on said card when it rests in the line of travel of said second roller, whereby at the first operation of the apparatus the entire matter stenciled on a card is printed on any article placed between it and one portion of the platen, while at the next operation only a part of said stenciled matter is printed on a second article placed between it and another portion of the platen.

19. An addressing apparatus adapted to operate with a series of stencil cards of uniform length, having guides, mechanism for intermittently feeding a succession of such cards endwise therethrough a distance at each operation of the apparatus equal to the length of a card and a platen extending over said guides a distance sufficient to cover one card entirely and a portion of another, combined with two simultaneously operating printing rollers and mechanism for rolling the same under the cards and platen across the line of feed of the cards during each period of rest between the operation of the feeding device, the first of said rollers being long enough to cover the entire area of stenciled matter on a card when it rests in the line of travel of said roller, while the second roller is only long enough to cover a portion of the stenciled matter on said card when it rests in the line of travel of said second roller, together with an ink fountain and doctor roll coöperating with the first mentioned roller only.

20. In an address printing apparatus for use in mailing periodicals, the combination with a series of cards each having an address stenciled at one end and certain additional data stenciled at the other end, of mechanism for simultaneously printing from said cards two strips of paper placed in said mechanism, said mechanism comprising means for intermittently feeding said cards transversely under said strips, and two printing devices located below the line of travel of the cards and adapted to operate simultaneously during each period of rest of the feeding mechanism, one of said devices being adapted to apply pressure and smear ink over the entire surface of a card resting above it and under one strip while the other is adapted to apply pressure only over that portion of another card which bears a stenciled address resting above it and under the other strip, whereby there are simultaneously printed in the one machine a record strip and an address strip.

21. In an address printing apparatus for use in mailing periodicals, the combination with a series of cards each having an address stenciled at one end and certain additional data stenciled at the other end, of mechanism for simultaneously printing from said cards two strips of paper placed in said mechanism, said mechanism comprising means for intermittently feeding said cards transversely under said strips, and inking means located below the line of travel of the cards at the point where it crosses the first paper strip adapted to ink the entire stenciled surface of the card below said first strip together with a device located below the line of travel of the cards where it crosses the second paper strip adapted to apply pressure to only that portion of the other card which bears a stenciled address, whereby there are simultaneously printed in the one machine a record strip showing both addresses and data, and a second strip containing addresses only.

22. The combination with an addressing machine having a storage magazine for stencil cards at one side, a receiving magazine for such cards at the other side, guides extending from one magazine to the other, a printing mechanism located along said guides, and means for feeding the cards from one magazine through the printing mechanism to the other, of a selective ejecting mechanism located at the discharge side of the printing mechanism, and adapted to divert certain of the cards from the guides after they have passed through said printing mechanism, said ejecting mechanism being operated by gearing from the printing mechanism.

23. In an addressing machine employing stencil cards, the combination with a selective ejector device having two adjustable projections for engaging recesses in the stencil cards, of a series of cards having differently disposed recesses formed therein adapted to mesh with said projections when properly adjusted, and means for moving said ejector device in a plane at right angles to the common axes of said projections and recesses.

24. As an element in a selective ejecting mechanism for address printing mechanism adapted to operate with a series of stencil cards, a selector plate movable in a direction parallel to the faces of the cards provided with a laterally adjustable projection on its face next to the cards, adapted to fit into a recess in the cards to be ejected.

25. The combination of a stencil sheet having an address stenciled in one portion and certain reference marks stenciled in another portion, separate from the first, a printing mechanism having a member adapted to apply ink and pressure over the entire face of said sheet, a second mechanism adapted to apply pressure over that portion only of the face of the sheet which bears the stenciled address, and means for feeding said sheet through the two mechanisms consecutively.

26. The combination with a stencil sheet having an address stenciled in one portion to one side of an imaginary straight line drawn across its face, and certain reference characters stenciled in the other portion on the other side of said line, of a printing mechanism comprising an inking roller long enough to overlap both said sets of stenciled characters, means for reciprocating said roller across the sheet, an impression roller only long enough to overlap the stenciled address, and means for reciprocating it across the sheet in a direction parallel to said imaginary line, together with means for feeding the sheets through said printing mechanisms past said rollers consecutively.

27. In an address printing apparatus for use in mailing periodicals, the combination with a series of stencils each having an address stenciled at one end and certain additional data stenciled at the other end, of mechanism for simultaneously printing from said stencils two strips of paper placed in said mechanism, said mechanism comprising means for intermittently feeding said stencils transversely under said strips, and impression means located below the line of travel of the stencils at the point where it crosses the paper strips adapted to ink the entire stenciled surface of one stencil and to engage only that portion of the other stencil which bears a stenciled address, whereby there are simultaneously printed in the one machine a record strip showing both addresses and data, and a second strip containing addresses only.

28. The combination of a stencil having an address stenciled in one portion and certain reference marks stenciled in another portion, separate from the first, an impression mechanism having a member adapted to apply ink over the entire face of said stencil, a second impression mechanism adapted to engage that portion only of the face of the stencil which bears the stenciled address, and means for feeding said stencil through the two mechanisms consecutively.

29. An addressing apparatus adapted to operate with a series of stencil cards of uniform length, having guides, mechanism for intermittently feeding a succession of such cards endwise therethrough a distance at each operation of the apparatus equal to the length of a card and a platen extending over said guides a distance sufficient to cover one card entirely and a portion of another, combined with two printing rollers and mechanism for rolling the same under the cards and platen across the line of feed of the cards during each period of rest between the operations of the feeding device, the first of said rollers being long enough to cover the entire area of stenciled matter on a card when it rests in the line of travel of said roller, while the second roller is only long enough to cover a portion of the stenciled matter on said card when it rests in the line of travel of said second roller, whereby at the first operation of the apparatus the entire matter stenciled on a card is printed on any article placed between it and one portion of the platen, while at the next operation only a part of said stenciled matter is printed on a second article placed between it and another portion of the platen.

30. In an address printing apparatus for use in mailing periodicals, the combination with a series of cards each having an address stenciled at one end and certain additional data stenciled at the other end, of mechanism for printing from said cards two strips of paper placed in said mechanism, said mechanism comprising means for intermittently feeding said cards transversely under said strips, and two printing devices located below the line of travel of the cards and adapted to operate during each period of rest of the feeding mechanism, one of said devices being adapted to apply pressure and smear ink over the entire surface of a card resting above it and under one strip while the other is adapted to apply pressure only over that portion of another card which bears a stenciled address resting above it and under the other strip, whereby there are printed in the one machine a record strip and an address strip.

31. In an address printing apparatus for use in mailing periodicals, the combination with a series of cards each having an address stenciled at one end and certain additional data stenciled at the other end, of mechanism for printing from said cards two strips of paper placed in said mechanism, said mechanism comprising means for intermittently feeding said cards transversely under said strips, and inking means located below the line of travel of the cards at the point where it crosses the first paper strip adapted to ink the entire stenciled surface of the card below said first strip together with a device located below the line of travel of the cards where it crosses the second paper strip adapted to apply pressure to only that portion of the other card which bears a stenciled address, whereby there are printed in the one machine a record strip showing both addresses and data, and a second strip containing addresses only.

EDWIN D. BELKNAP.

Witnesses:
G. P. PAYSON,
FRANK G. HILDICK.